United States Patent [19]

Rupp et al.

[11] 4,083,520
[45] Apr. 11, 1978

[54] TETHERLINE SYSTEM FOR ORBITING SATELLITES

[75] Inventors: Charles C. Rupp, Madison; Ralph R. Kissel, Huntsville, both of Ala.

[73] Assignee: The United States of America as represented by the Administrator of the National Aeronautics and Space Administration, Washington, D.C.

[21] Appl. No.: 739,908

[22] Filed: Nov. 8, 1976

[51] Int. Cl.² ............................................. B64G 1/00
[52] U.S. Cl. .................................... 244/167; 244/161
[58] Field of Search ............... 244/115, 116, 158, 160, 244/161, 162, 164, 167; 114/144 B, 230; 242/45, 75.51; 254/173 R, 173 B; 73/143, 144

[56] References Cited

U.S. PATENT DOCUMENTS

| 2,842,339 | 7/1958 | Gresham et al. | 254/173 B |
| 3,333,788 | 8/1967 | Donovan et al. | 244/158 |
| 3,381,527 | 5/1968 | Grubbs | 73/144 |
| 3,532,298 | 10/1970 | Swet | 244/167 |
| 3,582,016 | 6/1971 | Sherman | 244/167 |
| 3,886,887 | 6/1975 | Cunningham | 114/230 |

Primary Examiner—Trygve M. Blix
Assistant Examiner—Charles E. Frankfort
Attorney, Agent, or Firm—George J. Porter; J. R. Manning; L. D. Wofford, Jr.

[57] ABSTRACT

A system for tethering one orbiting space vehicle to another in which a tetherline between the vehicles is controlled by a motorized reel which in turn is controlled to deploy, retrieve, or maintain a constant line length while effecting a stabilizing influence on the line. This is accomplished by applying a tension to the line which takes into account the instantaneous length of the line, rate of change of the length of the line, and certain constants which vary depending upon the mode of operation, deployment, retrieval, or station keeping.

6 Claims, 3 Drawing Figures

TETHERLINE SYSTEM FOR ORBITING SATELLITES

ORIGIN OF THE INVENTION

The invention described herein was made by employees of the United States Government, and may be manufactured and used by or for the Government of the United States of America for governmental purposes without the payment of any royalties thereon or therefor.

BACKGROUND OF THE INVENTION

1. Field of the Invention

This invention relates to the tethering of orbiting space vehicles, and particularly to a system for controlling the position of one space vehicle, e.g., along a local vertical relative to another.

2. General Description of the Prior Art

Tethered sub-satellites have been proposed for a variety of space applications. In a simple case, suggested for rescuing stranded astronauts, a buoy on a tetherline would simply be deployed with an initial velocity from the rescue vehicle to the astronaut, and then the tetherline would be reeled back after the astronaut had grabbed the buoy. A principal difficulty with this method is that slight variations in the initial velocity of the buoy with respect to the rescue vehicle, or errors in the tetherline tension, cause large errors in the final state of deployment or retrieval of the buoy.

Another proposed method of tethering two orbiting space vehicles together suggests that one of the vehicles be placed in a somewhat egg-shaped trajectory relative to the other and maintaining them in such position by periodically tugging on a tetherline which connects them. This approach was determined to be unattractive for flight because of the difficulty of precisely determining and controlling the tugging forces to be applied and of providing constant manned supervision which would be required to insure flight safety.

A third method calls for the deployment of a sub-satellite in an orbit below a main satellite wherein initial deployment would be accomplished with a drag balloon, which would then be destroyed, and final deployment effected by slowly unwinding the tetherline from a reel. While deployment in this manner would be operative, the realization of such a system would encounter the same problems discussed above, notably that of effecting sufficient stabilization of the sub-satellite and of eliminating deployment errors.

SUMMARY OF THE INVENTION

In accordance with this invention, a tetherline connecting a sub-satellite to a main satellite would be controlled by a motorized reel which provides a line tension which is varied, increased or decreased, as a function of length of tetherline and rate of change of length of tetherline, with the effect of deploying, retrieving, and/or station keeping the sub-satellite along the main satellite local vertical.

DETAILED DESCRIPTION OF THE DRAWINGS

Figure 1:
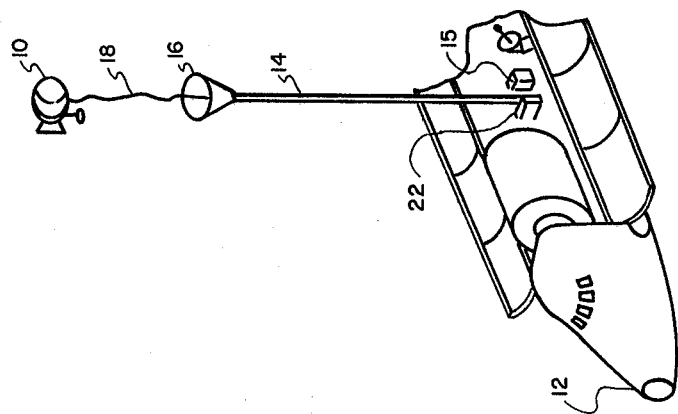
FIG. 1 is a pictorial illustration of a sub-satellite tethered from a main satellite.

FIG. 1 generally illustrates an application of the invention wherein sub-satellite 10 is deployed from a main satellite 12. It is assumed that the satellites are in orbit and that the orbital speed is one which effects a stabilization in the radius of orbit of main satellite 12. It will be further assumed that it is desired to deploy sub-satellite 10 along a local vertical upward as illustrated by the extension and orientation of mast 14 from satellite 12 by mast deployment system 15 (not shown in detail). Initially, sub-satellite 10 would be held in docking cradle 16 at the end of mast 14 by line or tetherline 18, the line being held fast on reel 20 (FIG. 2) of reel assembly 22. By virtue of the vertical displacement of sub-satellite 10 on mast 14 (typically 30 to 50 meters) from the orbit of the main body of satellite 12, the former would be moved at a higher absolute velocity than satellite 12, and there would thus occur a force along the vertical upward which, upon the release of tetherline 18, would enable sub-satellite 10 to achieve an initial velocity upward away from satellite 12. Similarly, if mast 14 had been deployed downward, wherein sub-satellite 10 would have been in a lower orbit, there would have been a downward or lowering force acting on it because of the smaller radius of orbit in which it is being moved. Thus, in either event, initial velocity would be imparted to a sub-satellite upon the release of tension in line 18.

Figure 2:
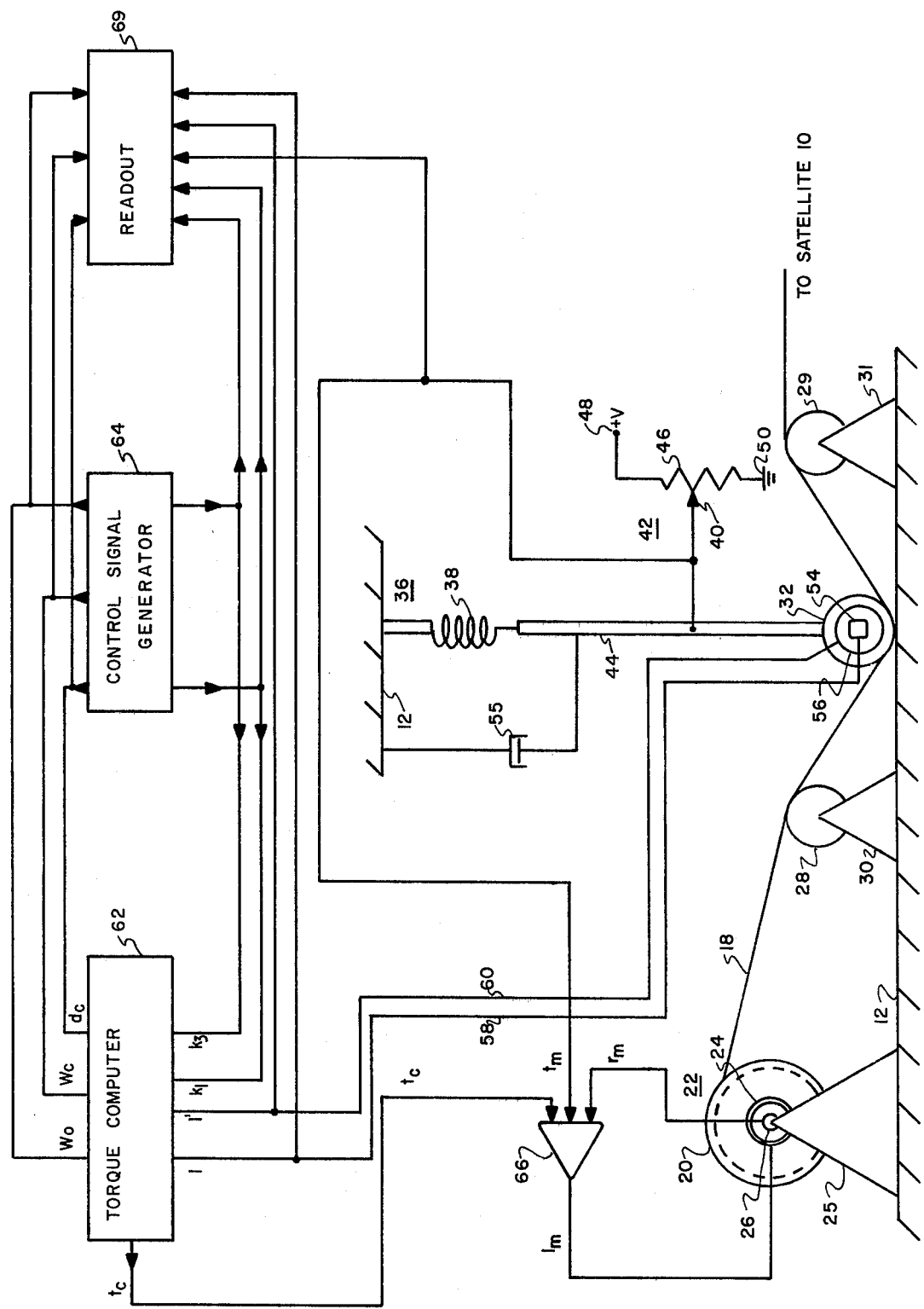
FIG. 2 is a diagrammatic illustration of an embodiment of this invention.

Referring to FIG. 2, it will be noted that tetherline 18 is wound on a reel or drum 20 of reel assembly 22 which is connected to direct drive, D.C. torque motor 24, in turn supported (by means not shown) on fixed support 25. Tachometer 26 is coupled to the shaft of torque motor 24 to provide a negative feedback, speed representative, signal to smooth and stabilize the responsiveness of motor 24, as will be further described. Tetherline 18 is fed from reel 20 over pulleys 28, 29, and 32, along mast 14, and to sub-satellite 10. Pulleys 28 and 29 are rotably mounted on fixed supports 30 and 31 (by means not shown), and driven pulley 32 is rotably mounted on movable arm assembly 36, in turn mounted on satellite 12 through spring 38. Thus, pulley 32 is biased against line 18, and, upon an increase or decrease in tension in line 18, spring 38 would compress or extend, accordingly. Movable contact 40 of potentiometer 42 is mechanically mounted on a movable arm portion 44 of an arm assembly 36 and thus is moved along resistance element 46 as a function of tension in line 18. A reference voltage is applied between terminals 48 and 50 of resistance element 46, and thus there is provided an electrical signal output from movable arm 40 representative of the tension present in line 18. Mechanical resonances in spring 38 and pulley 32 are partially damped by damper 55 which may be in the form of a dash pot. Rotation counter 54 and tachometer 56 are coupled to pulley 32 and provide, respectively, signals l and l' on leads 58 and 60, representative of the length of line deployed and rate of deployment, respectively.

The torque to be applied by torque motor 24 to drum 20, and thereby tension to line 18, is computed by torque computer 62 which functions to solve the following equation wherein the length of line signal $l$ and change in length of line signal $l'$ are utilized as principal variables;

$$t_c = (w_c^2 + 3w_o^2) \, l + 2d_c w_c l' - w_c^2 (k_1 l + k_3).$$

The terms other than $l$ and $l'$ are supplied to torque computer 62 by control signal generator 64 as follows:

$w_o$, the orbital angular rate of main satellite 12, represented by a fixed level signal;

$w_c$, the control or stretch frequency constant signal, representative of a frequency approximately one to four times that of $w_o$;

$d_d$, a damping constant signal, represented by a selected signal value equal to approximately 0.2 to 2;

$k_1$, a signal represented constant, approximately representative of 2 for deployment, 0.93 for retrieval, and 0 for station keeping; and $k_3$, a signal represented constant, approximately representative of 7,000 for deployment, 0 for retrieval, and of the value of final desired length of tetherline 18 for station keeping.

In a simple case, control signal generator 64 would include a source of voltages or a voltage and a series of potentiometers connected to it which would either be adjusted by hand or be automatic to provide the signals referred to in the preceding paragraph.

The output of torque computer 62, $t_c$, a tension command signal, is fed to one input of summing servo amplifier 66, a "present tension" feedback signal from potentiometer 42, $t_m$, representative of the tension in line 18, is fed to a second input, and a rate feedback signal $r_m$, representative of the instantaneous speed of motor 24, is, conventionally, fed to a third input of amplifier 66. The latter two signals are of opposite sign to the first of the signals, and thus there is provided at the output of amplifier 66 a signal $l_m$ to motor 24 which will then produce a tension in line 18 corresponding to the commanded tension signal $t_c$.

Readout or monitor 69 receives the pertinent outputs $w_o$, $w_c$, $d_c$, $l$, $l'$, $k_1$, $k_3$, $t_c$, and $t_m$ and displays these utilizing coventional selector switches to make selections, the display typically being a numerical readout either in the form of a calibrated meter or a digital display.

Figure 3:
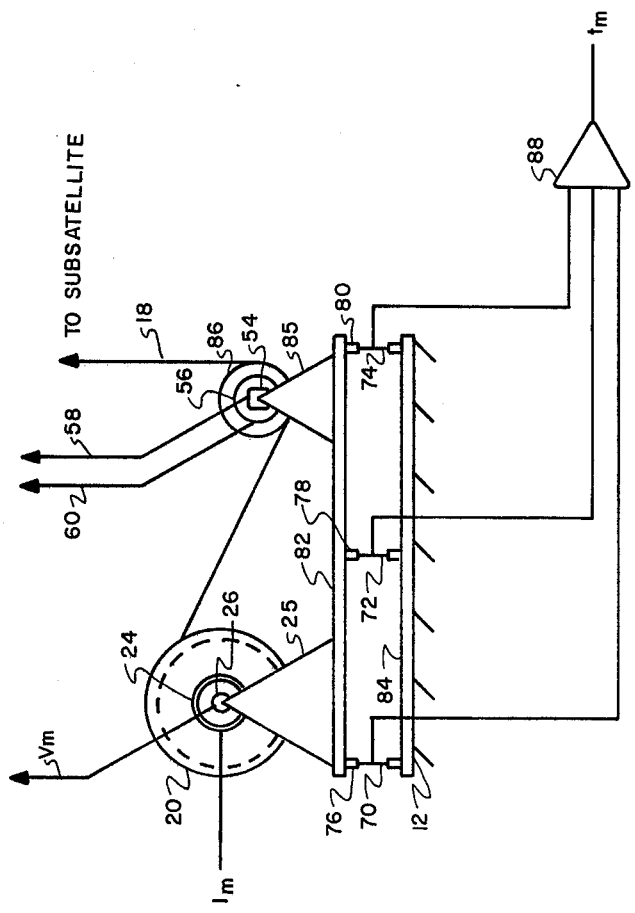
FIG. 3 is a diagrammatic illustration of a modification of the system shown in FIG. 2.

FIG. 3 illustrates a modification of the invention wherein the line tension, $t_m$, measurement is obtained from strain gauges 70, 72, and 74, forming a portion of supports 76, 78, and 80 which support platform 82 on a frame portion 84 of satellite 12. Reel 20 is then mounted on platform 82 by mount 25, together with pulley 86 mounted on platform 82 by mount 85, over which line 18 is played. The outputs of strain gauges 70, 72, and 74 sense the tension between platform 82 and satellite 12, and thereby the tension in line 18. These outputs are then summed in amplifier 88 to provide a total tension output $t_m$ which is applied to servo amplifier 66 as illustrated in FIG. 2.

For the deployment case, the tension which is commanded is slightly lower than the gravity gradient force which would be applied to the sub-satellite mass if the sub-satellite was in equilibrium at its present distance. A tension greater than this amount will cause retrieval. Stabilization of the sub-satellite at a desired deployment distance is enhanced by adjustment of the constants described above. Any residual swing motion is damped by the effect of tension feedback signal $t_m$. The damping action can be explained by considering the tetherline as a spring. As the sub-satellite swings, variations in the gravity gradient force cause the spring to stretch and contract. These oscillations in the spring stretching motion are sensed by a movement of spring 38 and movable arm 40 of potentiometer 42, and a feedback signal from the potentiometer is used to counteract the variable force caused by the oscillations and thus to reduce them. Further, as described, a damping constant $d_c$ may be selected in accordance with a particular mission to make the tetherline appear to have any spring constant and degree of damping desired. In operation, the occurrence of a swinging motion is effectively converted to a stretching motion, and then the stretching motion is damped by the control system to maintain a substantially constant length and stabilized state of the tetherline.

Retrieval of the tethered sub-satellite 10 is similar to the deployment of it, except that the control signal generator and torque computer command a tension greater than equalibrium tension at the present sub-satellite distance. This causes the motor and reel to retrieve the tetherline. The terminal phase of the retrieval occurs very slowly, and the capture of the sub-satellite is accomplished using the deployment boom and cradle 16. In this terminal phase, the sub-satellite is slowly drawn into cradle 16, and then the boom is typically retracted, drawing the sub-satellite back into main satellite 12.

By means of the present invention, the motion of the satellite is stabilized, basically limiting its motion to movement along a vertical during deployment and retrieval and to a fixed relative position with respect to a main satellite during station keeping.

Having thus disclosed our invention, what is claimed is:

1. A system for tethering a first orbiting satellite to a second orbiting satellite comprising:
    a reel and motor coupled to said reel, both being supported by said first satellite;
    a tetherline wound on said reel and connected at one end to said second satellite;
    first transducer means responsive to the movement of said line for generating a signal $l$ representative of the length of tetherline betwween satellites;
    second transducer means coupled to said tetherline for generating a signal $l'$ representative of the rate of change of length of line between said satellites;
    third transducer means for generating a signal $t_m$ representative of the tension in said tetherline;
    signal means responsive to said first, second, and third transducer means and signals $l$ and $l'$ and $t_m$, respectively, and to the orbital angular speed $w_o$ of said first satellite for generating an electrical input to said motor;
    means for generating a first signal constant $k_1$ and a second signal constant $k_3$, selectively, and approximately as follows:
        for deployment, $k_1 = 2$ and $k_3 = 7,000$,
        for retrieval, $k_1 = 0.93$ and $k_3 = 0$, and
        for station keeping, $k_1 = 0$ and $k_3 =$ the desired length of tetherline; and
    said signal means being responsive to said constants for providing said input to said motor.

2. A system as set forth in claim 1 wherein said signal means comprises:
    computation means for providing an output $t_c$ where $t_c = (w_c^2 + 3w_o^2) \, l + 2d_c w_c l' - w_c^2 (k_1 l + k_3)$ wherein $w_c$ has an approximate value between $w_o$ and $4w_o$, and $d_c$ has an approximate value of between 0.5 and 2; and
    servo means responsive to the output of said computation means, $t_c$, and said third transducer means, $t_m$ for providing an input to said motor.

3. A system as set forth in claim 2 including means for initially positioning said second satellite at a fixed, discrete distance from said first satellite along a radial line with respect to the orbit of said first satellite, whereby upon a reduction of tension in said tetherline, said tetherline and said second satellite deploy from said first satellite.

4. A system as set forth in claim 2 wherein said third transducer means comprises means for supporting said reel on said first satellite, and including means for sensing the tension in said support and providing said signal $t_m$ to said servo means.

5. A system as set forth in claim 2 wherein said third transducer means comprises a pulley in engagement with said tetherline, spring bias means supporting said pulley on said first satellite, and potentiometer means coupled to said pulley for providing said electrical output $t_m$ representative of the tension in said tetherline.

6. A system as set forth in claim 5 including damping means interconnecting said pulley and said first satellite.

* * * * *